(No Model.)
J. GOSNEY & D. B. JONES.
THILL COUPLING.
No. 434,334.   Patented Aug. 12, 1890.
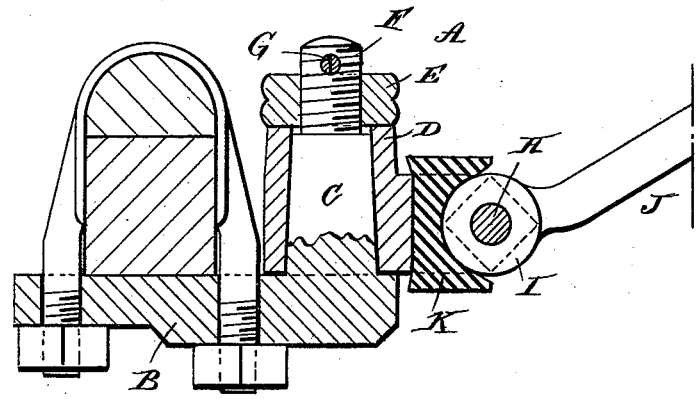
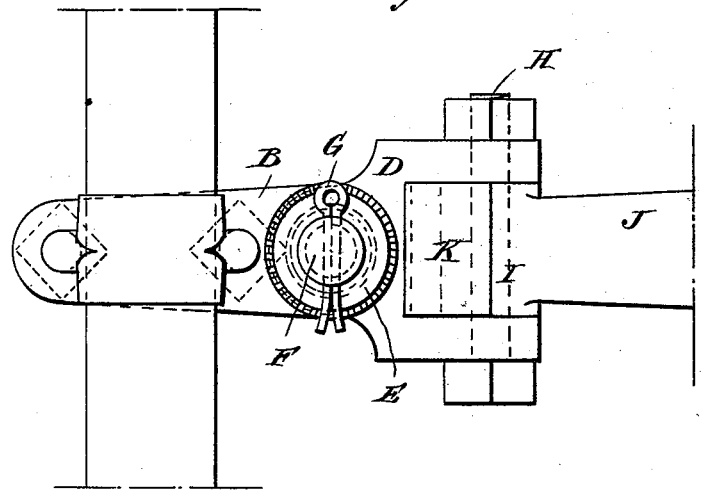
WITNESSES:
Dom Twitchell
C. Sedgwick
INVENTOR:
J. Gosney
D. B. Jones
BY
Munn & Co
ATTORNEYS.

UNITED STATES PATENT OFFICE.

JOHN GOSNEY AND DAVIS B. JONES, OF WILMINGTON, DELAWARE.

THILL-COUPLING.

SPECIFICATION forming part of Letters Patent No. 434,334, dated August 12, 1890.

Application filed May 7, 1890. Serial No. 350,864. (No model.)

*To all whom it may concern:*

Be it known that we, JOHN GOSNEY and DAVIS B. JONES, both of Wilmington, in the county of New Castle and State of Delaware, have invented a new and Improved Thill-Coupling, of which the following is a full, clear, and exact description.

The object of the invention is to provide a new and improved thill-coupling which is simple and durable in construction and permits of quickly changing the shafts for single or double teams.

The invention consists of a clip-plate provided with a vertically-arranged pin, on which is mounted a shaft-box carrying the shaft pivot or bolt.

The invention also consists of certain parts and detail and combinations of the same, as will be hereinafter fully described, and then pointed out in the claims.

Reference is to be had to the accompanying drawings, forming a part of this specification, in which similar letters of reference indicate corresponding parts in both figures.

Figure 1 is a sectional side elevation of the improvement, and Fig. 2 is a plan view of the same.

The improved thill-coupling A is provided with a clip-plate B, clipped in the usual manner to the front axle and projecting a suitable distance to the front of the latter, as is plainly shown in the drawings. On the front projecting end of the clip-plate B is secured or formed an upwardly-extending pin or stud C, on which is fitted to turn the shaft-box D, held in place on the pin or stud C by a nut E, screwing on the reduced threaded end F of the pin or stud C. When the box D is in place and the nut E is screwed up, the latter is locked in place by a split key G, passing through the threaded end F on top of the nut E.

The shaft-box D is provided with the usual fork, in which is held the bolt H, forming the pivot for the eye I of the shafts J. In the fork of the shaft-box D is also held a block of rubber K, engaging the inner half of the eye I, so as to prevent rattling when the device is in use. It will be seen that the shafts can be readily detached from the clip-plate B without removing the bolt H by taking out the key G and unscrewing the nut E, so that the shaft-box D lifts off of the pin or stud C, and another shaft-box can be placed thereon and fastened by the nut E, locked in place by the key G. Thus a rapid change of shafts can be made without disturbing the relative positions and connections of the shafts with the shaft-box D.

Having thus described our invention, we claim as new and desire to secure by Letters Patent—

1. In a thill-coupling, the combination of clip-plates, each provided with a vertical stud or pin, and boxes to which the thills are pivoted, each provided with an aperture to receive the pin or stud of the clip-plate, substantially as described.

2. In a thill-coupling, the combination, with a clip-plate provided with a stud or pin arranged vertically and provided with a reduced threaded end, of a shaft-box fitted on the said stud or pin and carrying the shafts, and a nut screwing on the reduced end of the said pin or stud, substantially as shown and described.

3. In a thill-coupling, the combination, with a clip-plate provided with a stud or pin arranged vertically and provided with a reduced threaded end, of a shaft-box fitted on the said stud or pin and carrying the shafts, a nut screwing on the reduced end of the said pin or stud, and a key for locking the said nut in place on the reduced threaded end, substantially as shown and described.

4. In a thill-coupling, the combination, with a clip-plate provided with a vertically-arranged stud or pin having a threaded end, of a shaft-box fitted on the said stud or pin and provided with the usual fork, a bolt held on the said fork and forming the pivot for the shaft I, and a nut screwing on the said threaded end of the pin or stud for holding the said shaft-box in place, substantially as shown and described.

JOHN GOSNEY.
DAVIS B. JONES.

Witnesses:
THOMAS I. RUSSELL,
ISAAC DILLIS.